UNITED STATES PATENT OFFICE.

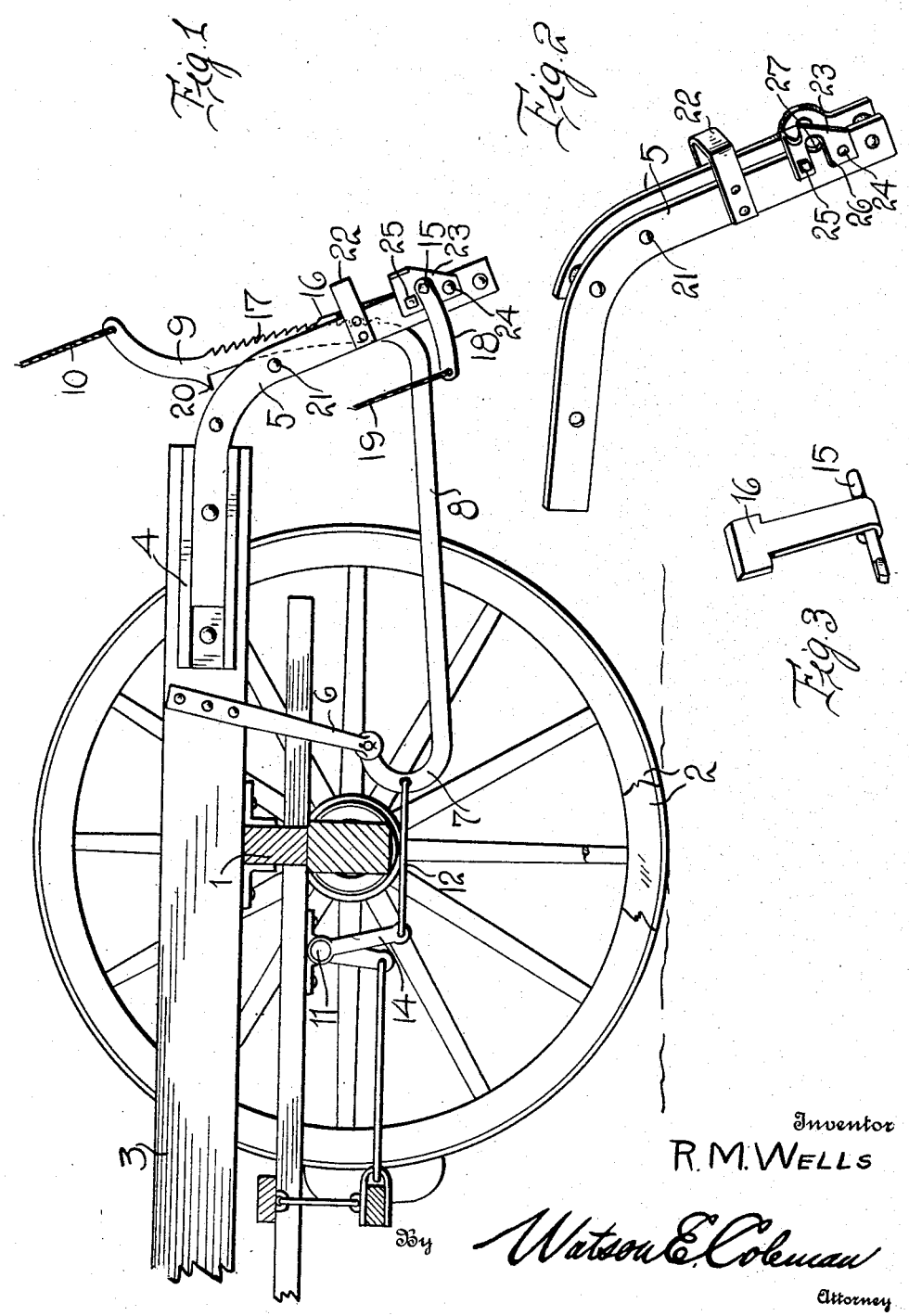

RALPH M. WELLS, OF SHORT CREEK, WEST VIRGINIA.

BRAKE MECHANISM.

1,172,416. Specification of Letters Patent. Patented Feb. 22, 1916.

Application filed June 9, 1915. Serial No. 33,111.

*To all whom it may concern:*

Be it known that I, RALPH M. WELLS, a citizen of the United States, residing at Short Creek, in the county of Brooke and State of West Virginia, have invented certain new and useful Improvements in Brake Mechanism, of which the following is a specification, reference being had to the accompanying drawings.

This invention relates to certain improvements in brake mechanisms and has relation more particularly to a rigging especially designed and adapted for use in connection with hay wagons; and it is an object of my invention to provide a novel and improved draft rigging whereby the same may be readily and effectively controlled by the driver without the necessity of leaving the seat.

The invention consists in the details of construction and in the combination and arrangement of the several parts of my improved brake mechanism whereby certain important advantages are attained and the device is rendered simpler, less expensive and otherwise more convenient and advantageous for use, all as will be hereinafter more fully set forth.

The novel features of the invention will be carefully defined in the appended claims.

In order that my invention may be the better understood, I will now proceed to describe the same with reference to the accompanying drawings, wherein—

Figure 1 is a view, partly in elevation and partly in section, illustrating a brake mechanism constructed in accordance with an embodiment of my invention in applied position; Fig. 2 is a view in perspective of the parallel straps together with their concomitant parts as herein embodied; and Fig. 3 is a view in perspective, detached, of the locking dog herein included.

As disclosed in the accompanying drawings, 1 denotes the rear bolster of a conventional hay wagon or the like and with which coact, in a conventional manner, the wheels 2.

3 denotes the side sills or ladder rails, to the rear extremity of one of which is secured the shoe or casting 4 from which depends on a predetermined incline the spaced straps 5.

6 denotes a hanger iron depending from the sill or rail 3 in advance of the shoe or casting 4 but in close proximity thereto and to the lower extremity of said hanger iron is pivotally engaged the upstanding arcuate extension 7 of the lever 8, said lever having its rear extremity provided with the upstanding extension 9 passing between the straps 5 and having suitably secured to its free extremity the flexible member 10 leading to the seat structure (not shown) of the wagon.

11 denotes the rock shaft of a conventional brake mechanism adapted to coact with the wheels 2, and 12 is an operating lever interposed between the rock arm 14 of the shaft 11 and the arcuate extension 7 whereby it will be perceived that upon upward movement being given to the lever 8, the brake mechanism will be caused to operatively engage the wheels 2.

Operatively supported by the lower extremities of the straps 5 is the shaft 15 to which is affixed the upstanding dog 16 adapted to coact with the rack portion 17 provided at the outer edge of the extension 9 and whereby it will be perceived that the brake mechanism may be locked in operative engagement with the wheels 2. The shaft 15 is provided with a rock arm 18 to the free extremity of which is secured a flexible member 19 also leading to the seat structure of the wagon and whereby it will be perceived that the dog 16 may be readily disengaged from the rack 17 when it is desired to release the brake.

In order to limit the downward movement of the lever 8, I provide the extension 9 with the inwardly disposed projection 20 adapted to engage the pin 21 bridging the space between the straps 5 adjacent their upper extremities. I also find it of advantage to provide the straps 5 with the outstanding yoke 22 whereby the dog 16 has its outward movement so limited as to prevent the same from passing beyond a center and thus assuring the requisite coaction between the dog and the rack.

From the foregoing description, it is thought to be obvious that a brake mechanism constructed in accordance with my invention is of an extremely simple and comparatively inexpensive nature and is particularly well adapted for use by reason of the convenience and facility with which it may be assembled, and it will also be obvious that my invention is susceptible of some change and modification without material departure from the principles and spirit thereof and for this reason I do not wish to be understood as limiting myself to the precise arrangement and formation of the several parts herein shown in carrying out my invention in practice.

It is to be observed that the dog 16 may be readily removed from or applied to operative position by properly manipulating the swinging plate 23 pivotally engaged, as at 24, with one of the straps 5 and normally locked in operative position through the medium of a conventional bolt 25 or the like. It is also to be observed that the plate 23 is provided with an open end slot 26 coacting with a recess 27 produced in the strap to afford the requisite bearing for the shaft 15.

I claim:

1. In combination with a body and a brake mechanism carried thereby, spaced straps depending from the body, a lever pivotally engaged with the body and extending between the spaced straps, an operative connection between the lever and the brake mechanism, a shaft rotatably supported by the straps below the lever, a dog fixed to the shaft and coacting with the lever for maintaining the same against movement in one direction, a rock arm secured to the shaft and provided with operating means whereby the dog may be disengaged from the lever, and means for imparting movement to the lever in one direction.

2. In combination with a body and a brake mechanism carried thereby, spaced straps depending from the body, a lever pivotally engaged with the body and extending between the spaced straps, an operative connection between the lever and the brake mechanism, a shaft rotatably supported by the straps below the lever, a dog fixed to the shaft and coacting with the lever for maintaining the same against movement in one direction, a rock arm secured to the shaft and provided with operating means whereby the dog may be disengaged from the lever, means for imparting movement to the lever in one direction, and a yoke carried by the straps for limiting the movement of the dog away from the lever.

3. In combination with a body and a brake mechanism carried thereby, a hanger depending from the body, a lever provided with an arcuate extremity pivotally engaged with the hanger, the opposite extremity of the lever being provided with an upstanding extension, spaced straps depending from the body and between which the extension is directed, said extension being provided with a rack, a dog pivotally supported by the straps and coacting with the rack, and an operative connection between the brake mechanism and the arcuate extremity of the lever.

In testimony whereof I hereunto affix my signature in the presence of two witnesses.

RALPH M. WELLS.

Witnesses:
CHARLES F. MILLER.
CHAS. E. M. HAFF.